United States Patent [19]

Petersen, Sr. et al.

[11] 3,925,112
[45] Dec. 9, 1975

[54] SOLDER FLUXES

[75] Inventors: Arthur Petersen, Sr., Florham Park; Leonard S. Mackowiak, East Hanover; Daniel Schoenholz, Basking Ridge, all of N.J.

[73] Assignee: Hercules Chemical Co., Inc., New York, N.Y.

[22] Filed: Feb. 19, 1974

[21] Appl. No.: 443,877

[52] U.S. Cl. ............... 148/25; 148/23; 148/26
[51] Int. Cl.² ................................. B23K 35/362
[58] Field of Search ........... 148/23, 25, 26; 29/495; 252/312

[56] References Cited
UNITED STATES PATENTS

| | | | |
|---|---|---|---|
| 2,612,459 | 9/1952 | Willard et al. | 148/23 |
| 2,612,460 | 9/1952 | Willard et al. | 148/26 |
| 2,700,628 | 1/1955 | De Rosa | 148/25 X |
| 2,756,497 | 7/1956 | Gale | 148/23 X |
| 2,805,970 | 9/1957 | McBride | 148/23 |
| 3,035,339 | 5/1962 | Matter et al. | 148/23 X |
| 3,158,120 | 11/1964 | Von Hessert | 148/23 X |
| 3,220,892 | 11/1965 | Durham, Jr. | 148/23 |
| 3,467,556 | 9/1969 | Stayner | 148/25 |
| 3,746,620 | 7/1973 | Vance | 148/23 |

FOREIGN PATENTS OR APPLICATIONS

| | | | |
|---|---|---|---|
| 834,031 | 5/1960 | United Kingdom | 148/23 |
| 607,935 | 9/1948 | United Kingdom | 148/23 |

*Primary Examiner*—Allen B. Curtis
*Assistant Examiner*—Thomas A. Waltz
*Attorney, Agent, or Firm*—Blum, Moscovitz, Friedman & Kaplan

[57] ABSTRACT

Within the series of fluxes of the present invention, there are emulsified self-cleaning soldering fluxes comprising an aqueous phase including from about 2 to about 30 parts by weight of a water soluble hydrazine salt and an oil phase including, for example, from about 5 to 50 parts by weight of a mixture of petrolatum and wax whose consistency varies with temperature. Also within the series of fluxes of the present invention, there are water solutions comprising an admixture of from about 2 to about 30 parts by weight of a water soluble hydrazine salt, up to about 5 parts by weight of a vegetable gum thickener, a wetting agent, and the remainder being water.

7 Claims, No Drawings

SOLDER FLUXES

BACKGROUND OF THE INVENTION

This invention relates to novel and improved soldering fluxes which are noncorrosive and self-cleaning and are particularly adapted for use in the soldering of copper, copper alloys and galvanized iron, under various soldering conditions.

Within the scope of the instant invention are novel emulsified self-cleaning fluxes having hydrazine salt therein as the active fluxing agent. The fluxes may be formulated as a paste or lotion depending upon the particular soldering need. While these fluxes are suitably viscous for application to even vertical joints prepared for soldering, they may be easily applied to the workpieces.

The fluxes of the present invention are "self-cleaning" in the sense that the parts to be soldered do not have to be precleaned before a flux is applied. Even abnormally dirty work-pieces do not have to be precleaned before the flux is applied. Furthermore, the soldered work-piece does not have to be cleaned after soldering because these fluxes are completely volatilized upon completion of the soldering operation.

The fluxes of the present invention are, moreover, noncorrosive. These fluxes do not even promote corrosion in soldered joints subjected to elevated temperature and humidity.

Thus, the present invention has for its object the provision of novel and improved soldering fluxes, especially adapted for use with copper, copper alloys and galvanized iron, which fluxes are self-cleaning, noncorrosive and easy to apply.

SUMMARY OF THE INVENTION

Generally speaking, in accordance with the invention, these emulsified self-cleaning soldering fluxes comprise an aqueous phase including from about 2 to about 30 parts by weight of a water soluble hydrazine salt and an oil phase including, for example, from about 5 to 50 parts by weight of a mixture of petrolatum and wax whose consistency varies with temperature.

The aqueous emulsion may be stabilized by including therein an emulsifier system which is an oil soluble admixture of fatty acid esters of sorbitol and ethoxylated fatty acid esters of sorbitol. Preferably, the emulsifier system is completely dispersible in water. Suitable fatty acid esters of sorbitol include sorbitan trioleate, sorbitan monostearate, sorbitan monolaurate and sorbitan tristearate. Suitable ethoxylated fatty acid esters of sorbital include polyoxyethylene sorbitan monooleate and polyoxyethylene sorbitan monostearate. While satisfactory admixtures of one or more members of each group may be formulated to stabilize the emulsion, a preferred emulsifier system comprises an admixture of sorbitan tristearate and polyoxyethylene sorbitan monostearate, and preferably the emulsified self-cleaning soldering flux will contain from about 0.1 to about 50 parts of the emulsifier system by weight in the flux composition.

An oxygen scavenger such as sodium sulfite is preferably included in the emulsion to minimize the formation of gas when the composition is enclosed within a container. Gas formation may occur when the composition is enclosed because hydrazine is a strong reducing agent. A small but effective amount of the oxygen scavenger may be added to the composition and preferably the composition will include from about 0.05 to about 5 parts by weight of the oxygen scavenger.

In one embodiment of the composition, the emulsified flux has the characteristics of a lotion. In a second embodiment, the emulsified flux has the characteristics of a paste. The form of the composition, lotion or paste, will depend upon the relative proportion of water phase and oil phase admixed into the composition. The oil phase may be an admixture of hydrocarbon fractions, for instance, paraffin wax or a petrolatum or like material.

Another flux composition within the scope of the invention may be characterized as a clear aqueous solution. While this flux is not an emulsion, it has the same properties as the fluxes heretofore described, i.e., it is self-cleaning, noncorrosive, easy to apply and particularly adapted for use in the soldering of copper, copper alloys and galvanized iron. This embodiment will be hereinafter described in detail.

Still other objects and advantages of the invention will in part be obvious and will in part be apparent from the specification. The invention accordingly comprises soldering fluxes possessing the features, properties and the relationship of components which will be exemplified in the compositions hereinafter described, and the scope of the invention will be indicated in the claims.

DESCRIPTION OF THE PREFERRED EMBODIMENTS

The fluxes of the present invention contain at least one hydrazine salt selected from the group consisting of the salts of the monobasic, dibasic and tribasic organic acids having a molecular weight of from 60 to 193 and the hydrochloric, hydrobromic, hydrofluoric and hydriodic acids. These precursor acids are water soluble and form water soluble salts with hydrazine. Organic acids having molecular weight lower than 60 form hydrazine salts which are too corrosive with respect to copper to be acceptable in use, while organic acids of higher molecular weight than 193 form compounds which are not sufficiently water soluble to be suited for that purpose.

Among these acids, the preferred group is the hydrohalides, i.e., hydrofluoric, hydrochloric, hydrobromic and hydriodic acid, and the most preferred hydrohalide is hydrochloric. Concomitantly, the most preferred hydrazine salt is hydrazine monohydrochloride.

In water solution, paste or lotion, the hydrazine salt is used in a minimum concentration of at least 2 percent by weight, and a maximum concentration of 30 percent by weight. Preferably, the fluxes contain about 10 percent by weight of hydrazine monohydrochloride.

The paste and lotion forms of the fluxes within the invention are emulsions which, in general, include from about 5 to 50 parts by weight of an oil phase, which preferably comprises a paraffin wax-petrolatum melt. In the lotion form, it is preferred that the melt contain substantially equal parts by weight of paraffin wax and petrolatum, while in the paste form, it is preferred that the melt contain approximately 2 parts by weight of petrolatum for each part by weight of paraffin wax.

As stated above, the emulsions may be stabilized by inclusion therein of from about 0.1 to about 50 parts by weight of a nonionic surfactant selected from the class consisting of fatty acid esters of sorbitol, ethoxylated fatty acid esters of sorbitol and mixtures thereof. The most preferable emulsifier system comprises an admixture of sorbitan tristearate and polyoxyethylene sorbitan monostearate. Optimum results are obtained when the weight ratio of the fatty acid ester of sorbitol is about 3 to about 6 parts for each part by weight of the ethoxylated fatty acid ester of sorbitol.

The remainder of the lotion or paste may be water, preferably deionized water. Deionized water is preferred because hydrazine is a strong reducing agent and may react even with trace quantities of metals which may be present in tap water.

Such a flux applied to the metal parts to be soldered removes the oxide film from the bare metal and solder by dissolving or loosening the film and floating it off into the main body of the flux. The molten flux then forms a protective blanket over the bare metal which prevents the oxide film from reforming. Liquid solder displaces the flux and reacts with the base metal to form an excellent bond. At the soldering temperature and after the flux has performed its function, the flux decomposes and vaporizes, leaving the metal surface clean.

Because hydrazine is a strong reducing agent it may be itself oxidized by atmospheric and molecular oxygen with the possible formation of nitrogen, hydrogen and ammonia gases. Therefore, these fluxes may develop positive internal pressure when stored in closed containers. Such a gas pressure build-up may distort the container housing the flux and foreshorten the shelf-life of the flux. It is found that this problem may be overcome by adding from about 0.05 to about 5 parts by weight of an oxygen scavenger, preferably sodium sulfite, to all forms of the flux, i.e., lotion, paste or aqueous solution.

Both the lotion and paste forms of the flux may include up to about 10 percent by weight of auxiliary components such as a humectant, active fluxing agent, for instance glutamic acid, and a bacteriostatic agent. In addition, these flux compositions may include minor amounts of a natural or synthetic vegetable gum, such as a carbohydrate or carboxymethocellulose gum or a like gum.

The flux composition within the scope of the invention that may be characterized as a clear aqueous solution includes the same hydrazine salt that may be employed in the lotion and paste forms, and the aqueous solution preferably includes between 2 to about 30 percent of the hydrazine salt. The preferred hydrazine salt is hydrazine monohydrochloride. An oxygen scavenger, such as sodium sulfite is preferably added to the aqueous solution to inhibit gas formation attributable to the oxidizing effect of hydrazine. Up to about 5 percent of a natural or synthetic vegetable gum, such as a carbohydrate or carboxymethocellulose gum, may be added to thicken the solution and facilitate application of the solution to selected areas of the work pieces to be soldered. The remainder of the composition may be water and preferably deionized water to inhibit any reaction between the hydrazine and trace amounts of metals usually found in ordinary tap water. While this composition is a satisfactory flux and provides a satisfactory bond between the soldered work pieces, it is preferable that the composition include a minor amount and up to about 20 percent of auxiliary components such as an active fluxing agent, for instance glutamic acid, a humectant, a preservative for the gum in the composition and a wetting agent, preferably of the ethoxylated phenol type, for example Triton X-100; however, a nonionic surfactant of the fluorocarbon type may be employed with satisfactory results.

The foregoing general description and the following detailed descriptions are exemplary and explanatory of the invention but are not restrictive thereof.

The following specific examples are illustrative of various solder fluxing compositions according to the present invention. In each of the examples which follow all parts are by weight on the flux composition.

EXAMPLE I

The preferred paste fluxing composition of the present invention comprises an aqueous emulsion consisting of:

| Aqueous phase | |
|---|---|
| Propylene glycol | 3.0 parts |
| Glutamic acid | 0.8 |
| Sodium sulfite | 0.5 |
| Water (deioniized) | 43.1 |
| Oil phase | |
| Petrolatum | 14.5 |
| Paraffin wax | 7.3 |
| Sorbitan tristearate | 18.0 |
| Polyoxyethylene sorbitan monostearate | 2.8 |
| Active fluxing agent | |
| Hydrazine monohydrochloride | 10.0 |
| | 100.0 |

Such an emulsion is conveniently prepared by separately admixing the aqueous phase and oil phase components, heating each admixture to about 170°F and admixing the aqueous phase mixture into the oil phase mixture. The emulsion thus obtained is stirred for about five and preferably up to ten minutes and the hydrazine monohydrochloride is then added to the emulsion.

EXAMPLE II

A less preferred but satisfactory paste flux composition comprises:

| Aqueous phase | |
|---|---|
| Hydrazine Monohydrochloride | 10.0 parts |
| Glutamic acid | 0.8 |
| Water | 46.6 |
| Oil phase | |
| Petrolatum | 14.5 |
| Paraffin wax | 7.3 |
| Sorbitan tristearate | 18.0 |
| Polyoxyethylene sorbitan monostearate | 2.8 |
| | 100.0 |

Such an emulsion is conveniently prepared in the manner heretofore described in Example I.

EXAMPLE III

The preferred lotion fluxing composition of the present invention comprises an emulsion consisting of:

| Aqueous phase | |
|---|---|
| Sorbitol solution (70%) | 1.0 part |
| Glutamic acid | 0.8 |
| Sodium sulfite | 0.5 |
| Vegetable gum | 0.7 |
| Bacteriostatic agent | 0.1 |
| Water (deionized) | 61.1 |
| Oil phase | |
| Petrolatum | 7.0 |
| Paraffin wax | 7.0 |
| Polyoxyethylene sorbitan monostearate | 2.8 |

-continued

| | |
|---|---|
| Sorbitan tristearate | 9.0 |
| Active fluxing agent | |
| Hydrazine Monohydrochloride | 10.00 |
| | 100.00 |

This emulsion may be conveniently prepared in the manner heretofore described in Example I.

EXAMPLE IV

A less preferred but satisfactory lotion fluxing composition consists of:

| | |
|---|---|
| Aqueous phase | |
| Hydrazine Monohydrochloride | 10.0 parts |
| Glutamic acid | 0.80 |
| Water (deionized) | 51.85 |
| Vegetable gum | 0.05 |
| Oil phase | |
| Petrolatum | 10.50 |
| Paraffin wax | 9.00 |
| Sorbitan tristearate | 15.00 |
| Polyoxyethylene sorbitan monostearate | 2.80 |
| | 100.00 |

The emulsion may be conveniently prepared in the manner heretofore described in connection with Example I.

EXAMPLE V

A satisfactory, but somewhat more viscous lotion flux may be obtained by modifying the composition of Example IV as follows:

Decrease the water content of the emulsion to 50.20;
Increase the vegetable gum content of the emulsion to 0.20 parts; and
Increase the petrolatum content of the emulsion to 12.00 parts.

The emulsion may be conveniently prepared in the manner described in Example I.

EXAMPLE VI

The preferred aqueous solution fluxing composition of the present invention comprises an aqueous solution consisting of:

| | |
|---|---|
| Glycerine | 1.0 part |
| Vegetable gum | 0.60 |
| Gum preservative | 0.04 |
| Nonionic wetting agent (Triton X-100) | 0.10 |
| Sodium sulfite | 0.50 |
| Water (deionized) | 86.96 |
| Hydrazine Monohydrochloride | 10.00 |
| Glutamic acid | 0.08 |
| | 100.00 |

The solution may be conveniently prepared by admixing the components exclusive of hydrazine monohydrochloride and glutamic acid for about 5 and preferably 10 minutes and then adding the hydrazine monohydrochloride and glutamic acid to the water. The admixture may then be heated at 100°F with constant agitation until all components completely dissolve.

It will thus be seen that the objects set forth above, among those made apparent from the preceding description, are efficiently attained, and, since certain changes may be made in the above flux compositions without departing from the spirit and scope of the invention, it is intended that all matter contained in the above description shall be interpreted as illustrative and not in a limiting sense.

What is claimed is:

1. A solder flux comprising an aqueous emulsion including an oil phase comprising from about 5 to about 50 parts by weight of a paraffin wax-petrolatum melt, the weight ratio of petrolatum being about 1 to about 2 parts for each part by weight of paraffin wax in said paraffin wax-petrolatum melt, and from about 0.1 to about 50 parts by weight of an emulsifier system comprising an oil soluble admixture of fatty acid esters of sorbitol and ethoxylated fatty acid esters of sorbitol, the weight ratio of fatty acid esters of sorbitol being about 3 to about 6 parts for each part by weight of ethoxylated fatty acid esters of sorbitol in said emulsifier system, and including an aqueous phase comprising from about 2 to about 30 parts by weight of a water soluble hydrazine salt, from about 0.05 to about 5.0 parts by weight of sodium sulfite, and the remainder being deionized water.

2. The aqueous emulsion of claim 1 wherein said fatty acid ester of sorbitol is selected from the group consisting of sorbitan trioleate, sorbitan monostearate, sorbitan monolaurate and sorbitan tristearate.

3. The aqueous emulsion of claim 1 wherein said ethoxylated fatty acid ester of sorbitol is selected from the group consisting of polyoxyethylene sorbitan monooleate and polyoxyethylene sorbitan monostearate.

4. The aqueous emulsion of claim 1 wherein said emulsifier system comprises an oil soluble admixture of sorbitan tristearate and polyoxyethylene sorbitan monostearate.

5. The aqueous emulsion of claim 1 wherein said water soluble hydrazine salt is selected from the group consisting of the hydrazine salts of the monobasic, dibasic and tribasic organic acids having a molecular weight of from 60 to 193 and the hydrogenhalide acids.

6. The aqueous emulsion of claim 5 wherein said hydrazine salt is hydrazine monohydrochloride.

7. A solder flux comprising an aqueous solution consisting essentially of 10.00 parts by weight of hydrazine monohydrochloride, 1.0 part by weight of glycerine, 0.80 parts by weight of glutamic acid, 0.50 parts by weight of sodium sulfite, 0.60 parts by weight of a vegetable gum, 0.04 parts by weight of a gum preservative, 0.10 parts by weight of a nonionic wetting agent, and the remainder being deionized water.

* * * * *